ELECTRONIC CONTROL APPARATUS

Filed Feb. 19, 1946 3 Sheets-Sheet 1

LYNN W. MARSH JR.
INVENTOR
By William D. Hall.
ATTORNEY

Dec. 19, 1950 L. W. MARSH, JR 2,534,287
ELECTRONIC CONTROL APPARATUS
Filed Feb. 19, 1946 3 Sheets-Sheet 2

LYNN W. MARSH JR.
INVENTOR
By William D. Hall
ATTORNEY

LYNN W. MARSH JR.
INVENTOR
By William D. Hall
ATTORNEY

Patented Dec. 19, 1950

2,534,287

UNITED STATES PATENT OFFICE 2,534,287

ELECTRONIC CONTROL APPARATUS

Lynn W. Marsh, Jr., United States Army, Arlington County, Va.

Application February 19, 1946, Serial No. 648,809

7 Claims. (Cl. 250—27)

(Granted under the act of March 3, 1883, as amended April 30, 1928; 370 O. G. 757)

The invention described herein may be manufactured and used by or for the Government for governmental purposes, without the payment of any royalty thereon.

This invention is in electrical apparatus and particularly is in electronic ring circuits.

The principal object of the invention is to provide means for readily reversing the order of conduction of the tubes of an electronic ring circuit.

Other objects will be apparent from a reading of the following specification and claims.

Figure 1:
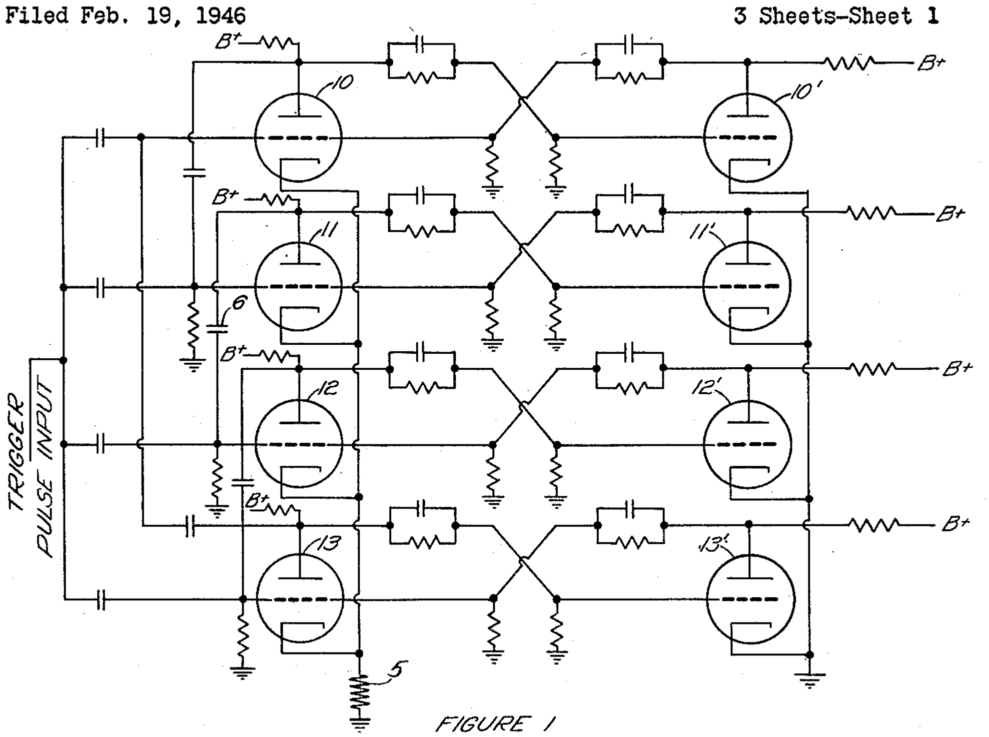
Figure 1 is a wiring diagram of a portion of a conventional Eccles-Jordan type of electronic ring circuit.

In general, a ring circuit such as is to be controlled by the present invention consists of two or more vacuum tube stages and their associated locking tube stages interconnected as shown in the diagram of Figure 1. Such a ring circuit is commonly used in timing or counting operations, the normal circuit arrangements being such that, when triggering pulses are applied to all ring stages simultaneously, the stages will conduct or otherwise change their conditions singly in predictable succession. Commonly, in a five-stage ring circuit, for example, the first stage will change condition responsive to the first, sixth, eleventh, etc., pulses, the third stage responsive to the third, eighth, thirteenth, etc., pulses. In known ring circuits, conduction or firing of the stages takes place in regular order, progression around the "ring" always occurring in one direction. The circuit illustrated consists of ring stages proper 10, 11, 12, and 13, and their respective locking stages 10', 11', 12', and 13'; the common cathode circuit, through resistor 5, insures that only one ring tube at a time will be in conducting condition; each locking stage causes a ring tube, once it has begun to conduct, to maintain its condition until a new pulse is applied to the grids of the ring tubes.

Negative triggering pulses are applied simultaneously to the grids of all of the ring tubes 10, 11, 12, and 13. These pulses serve to extinguish any conducting tube. As a tube is extinguished, the positive-going voltage at its plate is applied through a differentiating circuit to the grid of the following ring stage to produce conduction therein.

Figure 2:
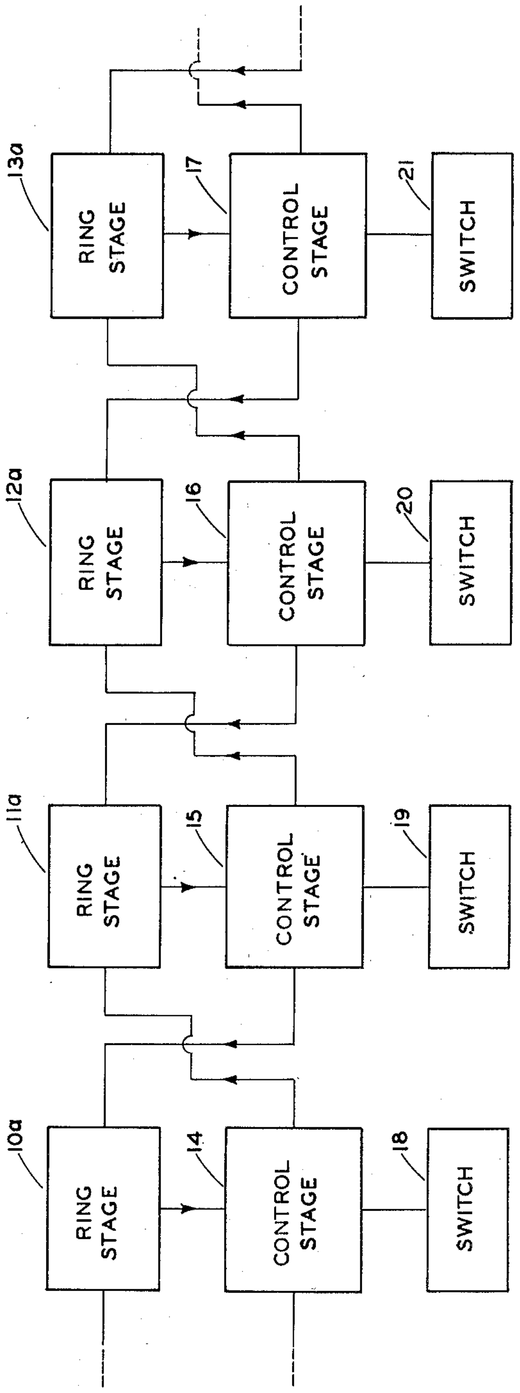
Figure 2 is a block diagram of the principal elements of the invention.

Referring to Figure 2, the blocks 10*a*, 11*a*, 12*a*, and 13*a* are the elements of a conventional electronic ring circuit (as just described), 14, 15, 16, and 17 are electronic means of my invention for controlling the conductivity of the ring stages, and 18, 19, 20, and 21, switching means which determine the mode of action of control stages 14, 15, 16, and 17.

Figure 3:
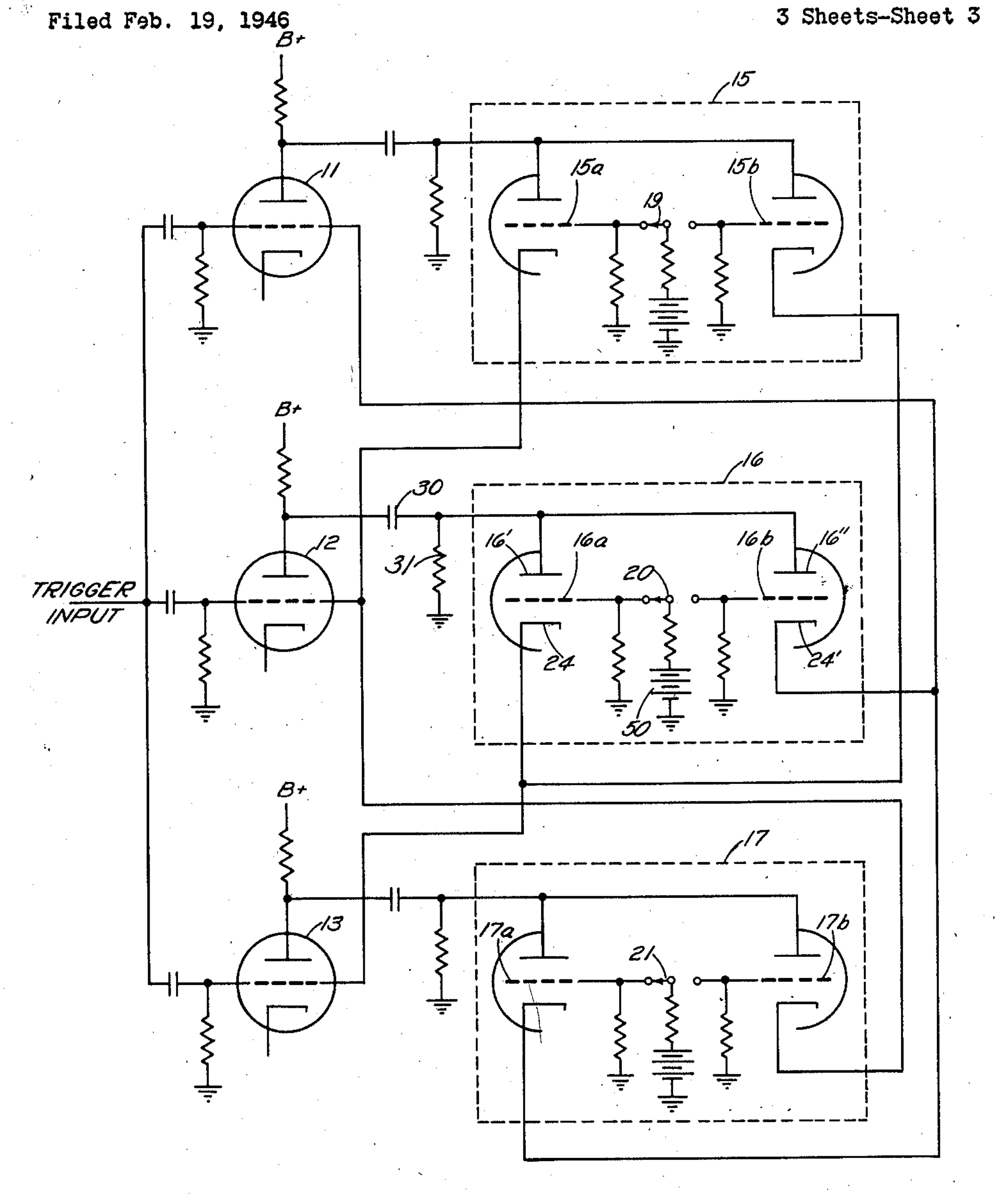
Figure 3 is a schematic wiring diagram of the present invention.

In order to control the ring, that is, reverse it when desired, the conventional ring of Figure 1 is modified as shown in Figures 2 and 3. Figure 2, it will be understood, illustrates in block form the complete reversing ring circuit, while Figure 3, a more detailed showing, represents for the most part replacement and additional elements necessary to transform a conventional ring to a reversing ring according to my invention; specifically relating Figures 1 and 3, in other words, each of the coupling condensers, as 6, of Figure 1 is replaced by a peaking circuit, as 30—31 plus a selective vacuum tube coupling, as 16. Each ring stage, as 12, for example, feeds into a control circuit, as 16, which in turn may act upon either of the two ring stages 11 and 13, depending upon the condition of switch 20. From Figure 3, the control circuits 15, 16, and 17, of Figure 2, (14 not being shown), may be seen to comprise a double triode each. The locking tube arrangement of Figure 1 is, of course, not disturbed.

The plate of ring tube 12 is connected through a differentiating circuit 30—31 to the plates 16'—16'' of control tube 16 while ring tube 11 is similarly associated with control tube 15, and ring tube 13, with 17.

One cathode, 24', of double triode 16 is connected to the input of the ring stage ahead of 12, namely, 11, the other cathode, 24, being connected to the input of the succeeding ring stage 13.

By means of batteries and switches, the grids of the control tubes can be selectively biased positive or zero. The grids 15*a*, 16*a*, and 17*a* are shown as having a positive bias. By throwing switches 19, 20, and 21, the grids 15*b*, 16*b*, and 17*b* can be made positive and 15*a*, 16*a*, and 17*a* brought to zero.

Assume it is desired to cause the ring circuit to fire in a "forward" or normal direction. The grids 15*b*, 16*b*, and 17*b* are zero biased while grids 15*a*, 16*a*, and 17*a* are positively biased. If ring tube 12 is firing and is cut off, the positive-going voltage at its plate is peaked and applied to the plates 16' and 16'' of tube 16. Since grid 16*a* only is positively biased, the circuit controlled thereby will conduct, whereas the circuit controlled by grid 16b (at zero bias) will not conduct. The positive-going voltage at cathode 24 is applied to the grid of ring tube 13 to cause conduction therein.

When the bias of grids 16a and 16b is reversed, it can be seen that the firing of tube 16 (brought about by the cut off of ring tube 12) will produce conduction in ring tube 11 instead of 13. If all the switches 19 through 21 are thrown so that the grids 15b, 16b, and 17b are biased positive, the firing order of the ring circuit will be reversed.

The mechanical switches shown (19, 20, and 21) should be understood to be representative only; in practice, electronic switching may be employed.

Figure 4:
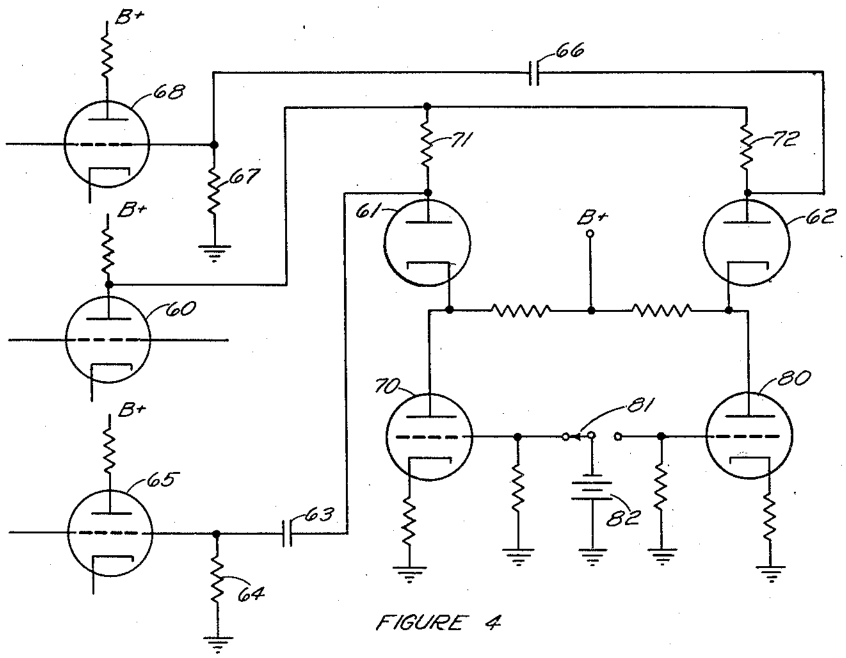
Figure 4 is a diagram of a modified control for a ring circuit.

The modification of Figure 4, adapted especially for operation with an input of positive trigger pulses, comprises two diodes 61 and 62 and two respectively cooperating triodes 70 and 80. With positive pulse operation, it will be understood, normally one ring tube is extinguished while all other ring tubes are conducting.

The output of ring tube 60 is applied through large resistances 71 and 72 to the plates of diodes 61 and 62, respectively, and thence through peaking circuits 63—64 on the one hand and 66—67 on the other to ring tubes 65 and 68.

A battery 82 supplies negative bias to the grid of either tube 70 or 80 through switch 81 and associated contacts.

Each control circuit (only one being shown although one should be assumed for each ring stage) acts as a variable resistance network. When tube 70 is negatively biased and, therefore, not conducting, the resistance of tubes 61 and 70 is very high compared to that of resistor 64 in peaking circuit 63—64, and the output of ring stage 60, dropped through resistor 71, is applied to ring stage 65. The differentiated pulse reaching tube 65 causes that tube to cut off.

At the same time, the grid of tube 80, of course, is at zero potential, and the tube is conducting. Its plate potential and thus the cathode potential of diode 62 falls to some value lower than before, the exact value being fixed by the circuit components but being in any case less than the output of tube 60 dropped across resistor 72. The result is that, when tube 80 is conducting, the cathode of tube 62 is negative with respect to its plate, and the two tubes 62 and 80 provide a low resistance path to ground for the output of tube 70, and ring tube 68 is not cut off.

Should switch 81 be thrown so as to connect battery 82 to the grid of tube 80, tube 70 will conduct, and the differentiated pulse from tube 60 will serve to cut off ring tube 68 while leaving tube 65 unaffected.

The arrangement of Figure 4 is inserted in the circuit of Figure 1 just as described for the selective control of Figure 3.

The foregoing description is in specific terms. Many modifications will suggest themselves to those skilled in the art. It will be obvious, for example, that separate triodes can be used in place of the double tubes of Figure 3, and, contrariwise, that double tubes can replace the diodes and triodes of the control circuit of Figure 4.

I claim as my invention:

1. A ring circuit comprising a plurality of ring stages each having a conducting condition and a nonconducting condition and means for controlling the order of progression thereof, including means for supplying triggering impulses for changing the condition of any ring stage when its condition is unlike that of the remaining ring stages, a control stage in the nature of a double triode, means for coupling said control stage to a ring stage for varying the conductivity of the former in accordance with variations in the conductivity of said ring stage, and means for coupling the output of one half of said control stage to a ring stage preceding and the output of the other half of the control stage to a ring stage succeeding the ring stage associated with the control stage.

2. A ring circuit comprising a plurality of ring stages each having a conducting condition and a nonconducting condition and means for controlling the order of progression thereof including means for supplying triggering impulses for changing the condition of any ring stage when its condition is unlike that of the remaining ring stages, a double triode, means for maintaining the plates thereof at like potentials, means for selectively applying biasing voltage to the grids of said triode, means for coupling the output of one half of said triode to a selected ring stage thereby to vary the conductivity of said ring stage with a variation in the conductivity of said one half of said triode, means for coupling the output of the other half of said triode to another ring stage thereby to vary the conductivity thereof with a variation in the conductivity of said other half of said triode, and means for associating said control stage with a further ring stage to vary the conductivity of said control stage in response to changes in the conductivity of said further ring stage.

3. A ring circuit comprising a plurality of ring stages each having a conducting condition and a nonconducting condition and means for controlling the order of progression thereof including means for supplying triggering impulses for changing the condition of any ring stage when its condition is unlike that of the remaining ring stages, a normally nonconducting double triode, means for maintaining the plates thereof at like potentials, means for selectively applying biasing voltage to the grids of said triode, means dependent upon the conductivity of a ring stage for providing a signal for the plates of said triode which may vary the conductivity thereof, and means for coupling the output of one half of said triode to another ring stage and the output of the other half to a further ring stage.

4. A ring circuit comprising a plurality of ring stages each having a conducting condition and a nonconducting condition and means for controlling the order of progression thereof including means for supplying triggering impulses for changing the condition of any ring stage when its condition is unlike that of the remaining ring stages, a control stage in the nature of a double triode coupled to each ring stage, means for selectively applying biasing voltage to the two grids of each of the control stages, means dependent upon the conductivity of a ring stage for applying a signal to the plates of the associated control stage, and means for coupling the outputs of one half of each of said control stages to the ring stage preceding and the outputs of the other half of each of said control stages to the ring stage succeeding the associated ring stage.

5. A ring circuit of $n$ stages and means for controlling the order of progression thereof, including means for supplying triggering impulses for changing the condition of any ring stage when its condition is unlike that of the remaining ring stages, $n$ control stages in the nature of double triodes, means for maintaining the plates thereof at like potentials, means for biasing the grids individually, each control stage being coupled to two ring stages to control the same and coupled to a third to be controlled thereby, a change in conductivity of a controlling ring stage normally producing a change in conductivity of one half of a control stage and thus in a ring stage controlled thereby.

6. A ring circuit comprising a plurality of ring stages each having a conducting condition and a nonconducting condition, means for supplying triggering impulses to said ring stages simultaneously to alter the condition of any stage the condition of which is unlike that of the other stages, and means for controlling the order of progression of the ring including an electronic switching device, means for supplying to said switching device an impulse from a predetermined ring stage when the condition of such ring stage is altered in predetermined fashion, and means controlled by said switching device and responsive to the impulse received from said predetermined ring stage for supplying an impulse to a selected one of a plurality of ring stages for inducing a change in the condition thereof.

7. An electronic commutator or the like, comprising a series of electronic trigger circuits having one status or an alternative status and switchable in status in response to an applied tripping pulse, coupling means for the trigger circuits including two sets of electronic discharge tubes alternatively effective to provide tripping pulses, said coupling means interconnecting the trigger circuits to apply a tripping pulse from either of said sets, when effective, to one only of the trigger circuits determined by the status of said trigger circuits to cause successive tripping pulses from one set, when effective, to switch the trigger circuits sequentially in a forward direction through the series and successive tripping pulses from the other set, when effective, to switch the trigger circuits in the reverse direction through the series, and means connected to said sets of tubes for rendering them selectively effective.

LYNN W. MARSH, Jr.

REFERENCES CITED

The following references are of record in the file of this patent:

UNITED STATES PATENTS

| Number | Name | Date |
|---|---|---|
| 2,272,070 | Reeves | Feb. 3, 1942 |
| 2,402,989 | Dickinson | July 2, 1946 |
| 2,403,918 | Grosdoff | July 16, 1946 |
| 2,404,918 | Overbeck | July 30, 1946 |
| 2,405,664 | Mumma | Aug. 13, 1946 |
| 2,426,454 | Johnson | Aug. 26, 1947 |
| 2,429,500 | Wolfner | Oct. 21, 1947 |
| 2,442,428 | Mumma | June 1, 1948 |

FOREIGN PATENTS

| Number | Country | Date |
|---|---|---|
| 357,532 | Great Britain | Sept. 14, 1931 |